(Model.)
A. HAMILTON.
HOSE NOZZLE.
No. 245,488.　　　　　Patented Aug. 9, 1881.
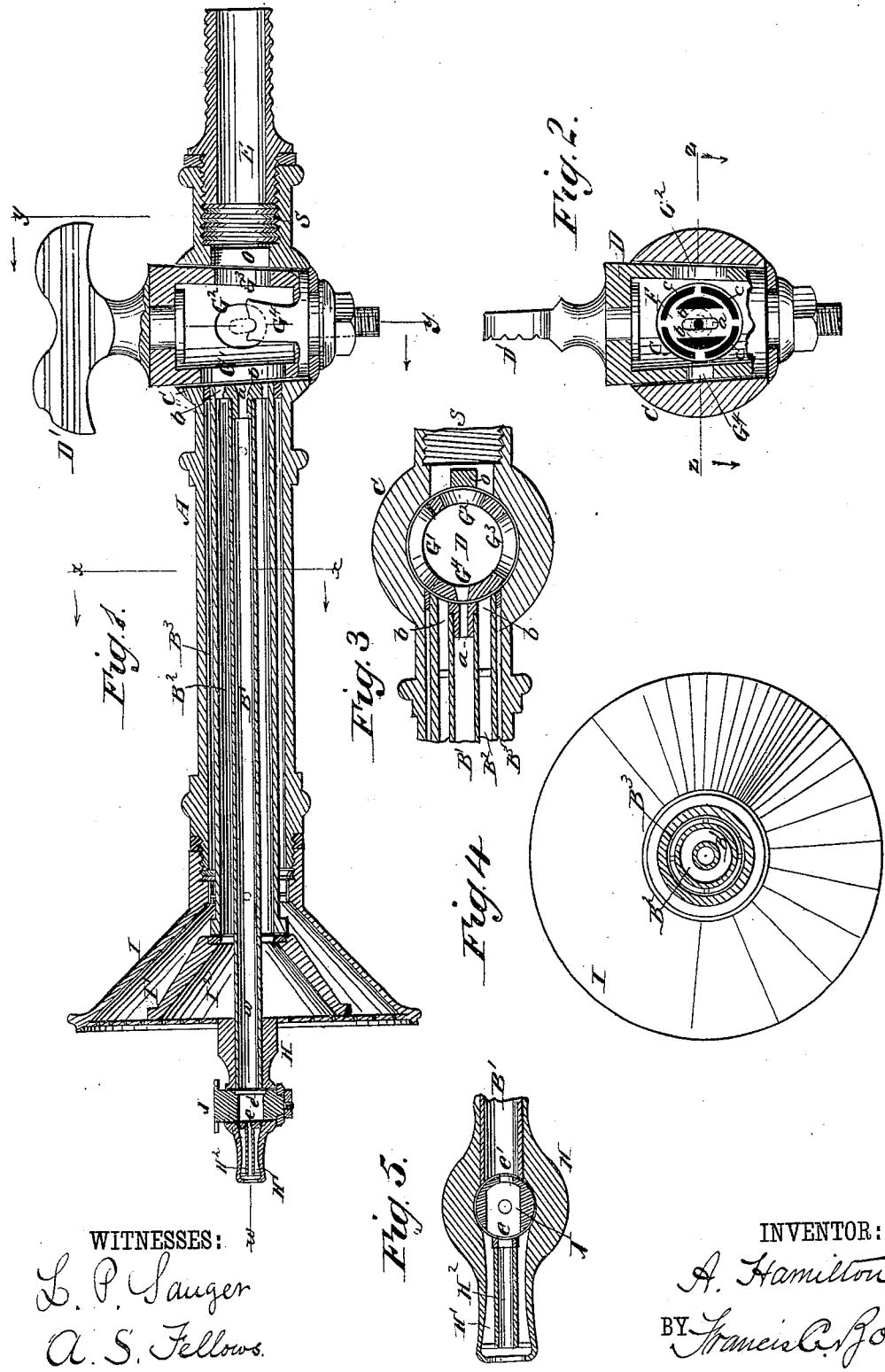
WITNESSES:
L. P. Sauger
A. S. Fellows.
INVENTOR:
A. Hamilton
BY Francis C. Bowen,
ATTORNEY.

UNITED STATES PATENT OFFICE.

ALEXANDER HAMILTON, OF NEW YORK, N. Y.

HOSE-NOZZLE.

SPECIFICATION forming part of Letters Patent No. 245,488, dated August 9, 1881.

Application filed June 6, 1881. (Model.)

*To all whom it may concern:*

Be it known that I, ALEXANDER HAMILTON, a subject of the Queen of Great Britain, and resident of New York city, in the county of New York and State of New York, have invented certain new and useful Improvements in Hoze-Nozzles; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

This invention relates to that class of nozzles embodying a plain jet and a rose-sprinkler for garden-hose, street-washers, or other similar uses; and it consists in certain novel combinations of parts, hereinafter fully set forth, whereby I am enabled not only to shut off the jet or sprinkler, but to vary the quantity of water discharging through them respectively.

This invention is illustrated in the accompanying drawings, in which Figure 1 represents a longitudinal central section, showing the main cock and jet-cock opened to their fullest extent. Fig. 2 is a cross-section on the line $y\,y$, Fig. 1. Fig. 3 is a longitudinal section, detail, on line $z\,z$, Fig. 2, showing the main cock turned to admit water to the central or jet water-way. Fig. 4 is a cross-section on the line $x\,x$, Fig. 1. Fig. 5 is a longitudinal section, detail, on the line $w\,w$, Fig. 1.

Similar letters indicate corresponding parts.

The letter A designates the stem of the nozzle, constructed of three tubes arranged one within the other and forming independent water-ways $B'\ B^2\ B^3$. These ways $B'\ B^2\ B^3$ connect at their rear ends with a socket, C, forming a seat for the main cock D, this socket having also connected thereto the induction or feed pipe E, and at the said ends of the ways the pipes are sustained by means of a bridge, F, which is provided with a central port, $a$, leading to the inner way, $B'$, with intermediate ports, $b$, leading to the way $B^2$, and with outer ports, $c$, leading to the way $B^3$. In the orifice S, connecting the induction-pipe E with the socket C, containing the main cock, is arranged a central bridge, O, forming a gate, as presently explained.

The main cock D is hollow and is provided with four lateral apertures, $G'\ G^2\ G^3\ G^4$, which are diametrically opposite to each other and have different sizes, their sizes being graduated in such a manner that the apertures $G'$ $G^2\ G^3$ are larger than the gate O of the induction-orifice, while the aperture $G^4$ has a less area than said gate, and when the first or largest aperture, $G'$, is brought opposite to the water-ways $B'\ B^2\ B^3$, as shown in Fig. 1, it exposes each of these ways, the aperture $G^3$ at the same time opening the induction-orifice S, while when the aperture $G^2$ is brought opposite to the water-ways the small aperture $G^4$ is opposite the gate O of the induction-orifice, and it being smaller than the gate, as before stated, the water is then shut off. When the aperture $G^3$ is brought opposite the water-ways it exposes the two inner ways, $B^2\ B^3$, but shuts off the outer way, $B'$, the aperture $G'$ then admitting water from the induction-orifice, and when the aperture $G^4$ is brought opposite the water-ways it exposes the inner way, $B^3$, but shuts off the two outer ways, $B'\ B^2$, the aperture $G^2$ then admitting water from the induction-orifice. By the arrangement of the apertures $G'\ G^2\ G^3\ G^4$ diametrically opposite each other a quarter-revolution of the cock D is required to displace one aperture and bring another one into its place opposite to the water-ways, while the water, moreover, obtains a straight passage through the nozzle in either position of the main cock. If desired, the main cock may be provided with an index for showing its position, and in this example I have grooved or notched the handle D' of the cock for that purpose.

On the forward or outer end of the stem A is arranged the jet H and the rose head or sprinkler I. The inner water-way, $B^3$, extends through the rose-head I, and jet H is connected thereto at that point, while the rose-head I is connected to the outer ends of the ways $B'$ $B^2$. This rose-head I is divided into two chambers, $I'\ I^2$, respectively communicating with the water-ways $B'$ and $B^2$, and it will be seen that as either or both of these ways are opened by the main cock D water is admitted to either or both of the chambers, thus increasing or diminishing the capacity of the rose-head.

The jet H is constructed with two independent ways or outlets, $H'\ H^2$, and with the jet is combined a cock, J, which, like the main cock D, is hollow, and is provided with two apertures, $e\ e'$, diametrically opposite to each other, the sizes of these apertures being so graduated that when the aperture $e$ is brought opposite the ways $H'\ H^2$ it exposes both, and when the aperture $e'$ is brought to that place it exposes the inner way, $H^2$, but shuts off the outer way, $H'$, each of the ways, moreover, communicating with the feedway $B'$ when the other is opposite the jetways. The cock J thus allows the size and force of the stream of water issuing from the jet to be regulated.

If desired, the jet-cock J, like the main cock D, may be provided with a suitable index for showing its position.

What I claim as new, and desire to secure by Letters Patent, is—

1. The combination, substantially as hereinbefore set forth, of the stem having the independent water-ways $B'\ B^2\ B^3$, the main cock having the graduated apertures $G'\ G^2\ G^3\ G^4$, the gate O of the induction-orifice, the jet communicating with the inner water-way, $B'$, and the rose-head divided into two chambers, $I'\ I^2$, communicating with the ways $B^2\ B^3$, respectively, for the purpose specified.

2. The combination, substantially as hereinbefore set forth, of the jet having the independent ways $H'\ H^2$, and the jet-cock having the graduated apertures $e\ e'$, for the purpose specified.

In testimony that I claim the foregoing I have hereunto set my hand this 31st day of May, 1881.

ALEXANDER HAMILTON.

Witnesses:
FRANCIS C. BOWEN,
EDGAR GARRETSON.